United States Patent [19]

Ericsson

[11] Patent Number: 4,945,829
[45] Date of Patent: Aug. 7, 1990

[54] METHOD FOR ORIENTATING PRINT MATERIAL FOR CORRECT PRINTING IN A PRINTING POSITION EXTERNALLY OF A PRINTING POSITION

[75] Inventor: Sylve J. D. Ericsson, Tumba, Sweden

[73] Assignee: Svecia Silkscreen Maskiner AB, Sweden

[21] Appl. No.: 235,398

[22] Filed: Aug. 23, 1988

[30] Foreign Application Priority Data

Aug. 28, 1987 [SE] Sweden ................................ 870333-8

[51] Int. Cl.⁵ .............................................. B41F 15/10
[52] U.S. Cl. .................................... 101/129; 101/485; 101/DIG. 36
[58] Field of Search ............... 101/DIG. 36, 129, 485, 101/486

[56] References Cited

U.S. PATENT DOCUMENTS

| | | | |
|---|---|---|---|
| 3,329,796 | 7/1967 | Manwaring | 219/10.55 |
| 4,214,522 | 7/1980 | Bille | 101/124 |
| 4,221,165 | 9/1980 | Ericsson | 101/126 |
| 4,226,181 | 10/1980 | Ericsson | 101/129 |
| 4,485,447 | 11/1984 | Ericsson | 101/DIG. 36 |
| 4,516,495 | 5/1985 | Ericsson | 101/129 |
| 4,589,335 | 5/1986 | Svantesson | 101/114 |
| 4,610,200 | 9/1986 | Metso | 101/126 |

FOREIGN PATENT DOCUMENTS 2045728A 11/1980 United Kingdom ................ 101/126

Primary Examiner—Clifford D. Crowder
Attorney, Agent, or Firm—Burns, Doane, Swecker & Mathis

[57] ABSTRACT

A method for correctly orienting print material in a silk screen printer includes determining the position of the print material relative to a reference position, storing that position, moving the print material to a printing position, printing a pattern on the print material, returning the print material to the previously determined position, and determining if a discrepancy exists between the desired position of the pattern and the actual position of the pattern on the print material. If a discrepancy exists between the desired and the actual position, one of a stencil frame, the print material, a printing table, and a first registered position is displaced for successive pieces of print material to minimize the discrepancy in successive actual pattern positions.

2 Claims, 1 Drawing Sheet

METHOD FOR ORIENTATING PRINT MATERIAL FOR CORRECT PRINTING IN A PRINTING POSITION EXTERNALLY OF A PRINTING POSITION

TECHNICAL FIELD

The present invention relates to a method for orientating a second pattern deriving from a first pattern formed on a stencil in relation to print material intended to receive said second pattern, so that the second pattern will have a pre-determined position or location in relation to said print material.

When the present invention is applied in a silk screen printer, the second pattern is formed by causing, in a printing location, coating substance or ink paste to pass through perforations in a cloth forming the first pattern and onto the print material, e.g. with the aid of a squeegee arrangement in a silk screen printer.

The present invention is also based on the assumption that the co-ordinates which define the position of the second pattern in relation to the print material are stored in a memory, so that co-ordinates applicable to a selected position can be compared with the co-ordinates applicable to the determined position of the pattern in relation to the print material.

BACKGROUND PRIOR ART

The U.S. Pat. No. 4,516,495 teaches a method of positioning in a printing location a second pattern, deriving from a first pattern formed on a stencil, in relation to print material intended to receive the second pattern, and in which method the second pattern is formed by causing a coating substance or an ink paste to pass through perforations or open meshes in the cloth forming the first pattern and onto the print material, e.g. with the aid of a squeegee arrangement in a silk screen printer.

According to this known method the two-dimensional position of the second pattern in relation to a reference point, normally a frame part of the printer, is stored in a memory, and when the material to which the second pattern is transferred has been moved to a printing position, the prevailing position of the material or the prevailing position of a pattern applied to the material is evaluated together with any discrepancy which would occur if the second pattern were to be applied to the print material while the material occupied its present position.

It is also proposed that a frame carrying a stencil exhibiting the first pattern and/or a printing table and/or the actual printing material is displaced in response to the magnitude and directional sense of the discrepancy to an extent such that when the second pattern is applied to the print material in this printing position, the pattern will have a position on the material in which the previously identified discrepancy is fully compensated for or satisfactorily compensated for.

The proposed method requires one or more material-positioning detecting and establishing devices to be introduced between stencil and print material when the material occupies a printing position, so as to enable the magnitude and directional sense of the discrepancy to be evaluated, and further requires the print material or the pattern to be displaced in order to compensate for the evaluated discrepancy prior to commencing the printing operation.

The disclosures made in U.S. Pat. No. 4,221,165 also form part of the prior art, this specification teaching a silk screen printer which includes a plurality of gripping beams which, in a first position—a material feed position, grip the material on which print is to be applied in a second position, a printing position, while registering the gripping beams.

This enables the print material to be moved along a precise transport path from the material feed position to the printing position. This precise transport path is afforded by the fact that each of the gripping beams can be registered relative to the printer chassis, or a part thereof, both of said positions.

For the purpose of registering the print material in the first position, it is proposed that in addition to a first registering means co-acting with the gripping beams a separate means is provided for co-action with the print material, so as to obtain precise registration of the print material in the first position, such that a registered gripping beam is able to collect a pre-registered print material and transport said material through an exact distance to the printing position.

SUMMARY OF THE INVENTION

Technical Problems

When considering the state of the prior art, as expressed in the aforegoing it will be seen that a technical problem resides in orientating print material externally of a printing position with the aid of simple means, so that when the print material is moved to the printing position the material will take a position such that a second pattern deriving from a first pattern carried by the stencil is applied to the material with a minimised discrepancy, by allowing a previous print on a print material to first serve as a standard, by storing in a computer system, via an optical detecting means, prevailing two-dimensional position values applicable to the earlier print in relation to the printer chassis or some other reference point, so that the position of the print material can be changed in the material feed position by stepping motors to a position in which the subsequent displacement to the printing position and subsequent printing affords correct orientation of the second pattern on the print material.

When considering the state of the prior art, as described in the aforegoing, it will also be seen that a technical problem resides in the ability to print the second pattern in the printing position precisely on the print material with a degree of accuracy similar to the accuracy achieved in a silk screen printer of the kind described and illustrated in the U.S. Pat. No. 4,516,495, but where the position of the print material can be read off without needing to introduce position-detecting devices between stencil and print material.

It will also be seen that a further technical problem, and one that requires qualified technical insight, resides in the realisation that the position of a table serving as a material feed location and displaceable in two directions can be changed with the aid of stepping motors, three stepping motors, in a manner such that the position of the table, and therewith the position of the print material, can be adapted to the position of the subsequent second pattern before the material is gripped by grippers or moved in some other way to the printing position through an exact known transport distance.

Another technical problem resides in the ability of increasing the printing rate, preferably to a rate higher than that achieved with a printer according to U.S. Pat. No. 4,516,495, without departing from the requirement of satisfactory accuracy with regard to the position of the second pattern on the print material, particularly when manufacturing printed circuit cards.

It will also be seen that a further technical problem is one of creating conditions, with the aid of simple means, which will enable the prevailing position of print material intended for receiving a second pattern to be established in a material feed position and in response to the detected position, and when necessary to so change the position of the first pattern formed on a stencil relative to the print material when said material is displaced to the printing position through an exact transport distance that a second pattern applied in the printing position to said print material obtains a pre-determined orientation in relation to the print material.

It is advantageous in this case to incorporate measures which will enable the print material to be moved along an exact transport path, to within narrow tolerances, from a material feed position to a printing position or location without altering the orientation of the material there-between. With regard to the determining of the position of the print material in a material feed location it will also be seen that a further technical problem resides in the ability to compensate for the discrepancy which can be expected to occur in a printing location or position as a result of stretching the first pattern on the stencil when this first pattern is transferred with the aid of a squeegee to the print material in the form of a second pattern.

A further technical problem resides in the provision of conditions, in a simple manner, which will enable compensations to be made for the unambiguous and constant discrepancy which is caused when a new stencil frame with a stretched stencil therein is inserted into the frame holder of the printer.

A further technical problem resides in the provision of conditions, with the aid of simple means, which will enable print material to be moved in an exact manner from a first material feed location to a printing position and, subsequent to printing a second pattern on said material, to move the thus printed material back to the first material feed position for registration so as to be able to establish in said feed position the position of the print applied on the print material and to store two-dimensional co-ordinate data thus obtained.

It will also be seen that a further technical problem resides in the provision of conditions, with the aid of simple means, whereby with the aid of this information printing of the second pattern on subsequent print material can be controlled in a manner such that the second pattern would be printed in a pre-determined position with a positional deviation smaller than 0.5 mm, preferably smaller than 0.03 mm, such accuracy being necessary in the manufacture of printed circuit board.

Another technical problem in this regard is one of realising that the accuracy afforded is related strongly to the resolution of the detecting means or camera equipment used.

Finally, it will be seen that a further technical problem resides in registering print material upstream of the printing position in a manner which affords substantially the degree of accuracy obtained with an arrangement according to the U.S. Pat. No. 4,221,165, but where a print serving as a reference value consititutes a standard for positioning the print material in the material feed position or location.

SOLUTION

The present invention is based on the fundamental features described and illustrated in the U.S. Pat. No. 4,516,495 and relates to a method of orientating a second pattern, deriving from a first pattern formed on a stencil, in relation to print material intended to receive said second pattern, so that the second pattern will have a predetermined position in relation to said print material, and in which method the second pattern is formed by causing, in a printing position, coating substance intended for said print material to pass through the first pattern and onto the print material, e.g. with the aid of a squeegee in a silk screen printer, and in which the position of the second pattern determined in relation to said print material is stored in a memory.

The present invention proposes in particular;
(a) That in a first registered position, a material feed position, the position of the print material is read-off in relation to a reference value, e.g. a printer chassis or part thereof, and the measurement value stored;
(b) That the print material is again passed to a second registered position, a printing position for receiving the second pattern.
(c) That the print material to which the second pattern is applied in accordance with "b" above is passed to the first position and registered in said position, and the position of the printed second pattern relative to said reference value is read-off and the resultant measurement value stored;
(d) That the stencil frame carrying the first pattern and/or the print material, and/or the printing table or alternatively the first registered position for the material is displaced in response to the established discrepancy between the actual position on the pattern, obtained in the transfer to "b", and its pre-determined position, to an extent such and in a direction such as to minimise the established discrepancy;
(e) That each subsequent print material, registered in the first and the second position in a similar manner is coated in the second position with a second pattern applied with minimised discrepancy.

In the capacity of a further development, the expression "minimised discrepancy" used in connection with the present invention implies full compensation of an established discrepancy, or compensation which can be deemed satisfactory in view of prevailing circumstances.

In accordance with a further development, the discrepancy which constantly occurs with an exchange of a stencil and stencil frame for applying a further pattern to print material in relation to the earlier applied second pattern is compensated for by applying the further pattern to the print material in accordance with "b", by establishing any discrepancy in the second pattern in accordance with "c", and compensating an occurrent discrepancy by displacing position-detecting means in the first registered position into the material feed position to an extent and a direction such as to minimise the established discrepancy and to lock these means in a thus set new position.

ADVANTAGES

Those advantages primarily afforded by a method according to the present invention reside in the provision of conditions for registering the print material in a material feed position, and there establish the position of the material optically upstream of the printing position, so that when the material is moved through a constant transport path to the printing position, the second pattern can be applied exactly without needing to subsequently check the position of the print by introducing position-detecting means between stencil and material.

The primary characteristic features of a method according to the present invention are set forth in the characterising clause of the following claim 1.

BRIEF DESCRIPTION OF THE DRAWING

An embodiment of a silk screen printer at present preferred and adapted for carrying out the invented method will now be described with reference to the accompanying drawing, in which.

DESCRIPTION OF EMBODIMENTS AT PRESENT PREFERRED

Figure 1:
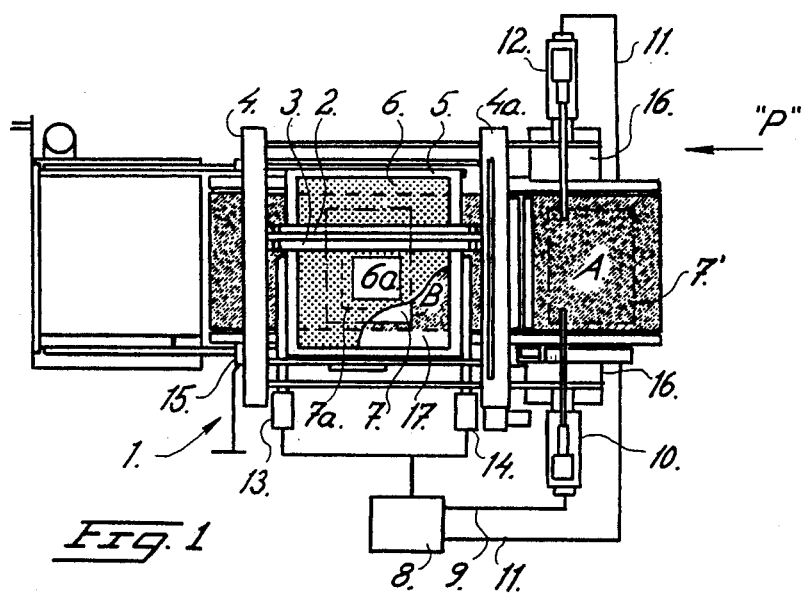
FIG. 1 is a horizontal view, highly simplified, of part of a silk screen printer.

FIG. 1 is a horizontal view of a silk screen printer 1 incorporating a squeegee arrangement 2 and a filler 3 arranged for reciprocating movement in guides 4,4a extending transversally to the material transport direction "P". A stencil 6 which has a first pattern 6a is stretched in a stencil frame 5, which is fixed in relation to the printer chassis. The pattern 6a is transferred by the squeegee arrangement 2 to print material 7, to form a second pattern 7a on said material. The two patterns 6a and 7a are slightly different from one another. This difference does not solely reside in the fact that one is formed on the stencil and the other is a print applied to the material, but also because the first pattern is slightly distorted when applied to the print material to form said second pattern, due to stretching of the stencil cloth as the squeegee moves thereacross.

For the sake of clarity, the position of the second pattern 7a on the print material 7 has been slightly exaggerated in FIG. 1 and is shown on one side of the pattern 6a.

The invention thus relates to a method of orientating the second pattern 7a, which derives from the pattern 6a carried by the stencil 6, in relation to the print material 7 onto which the first pattern is printed to provide the second pattern 7a, so that the second pattern 7a will take a predetermined position relative to the print material 7, without needing to introduce material position-determining devices between stencil and printing table in the printing position.

The second pattern 7a is formed by causing, in a printing position, coating substance, printing paste or the like to pass through perforations or meshes conforming to the first pattern 6a in the stencil cloth, and onto the print material 7 located in the printing position, e.g. with the aid of the squeegee 2 in the printer 1.

The established position of the second pattern 7a in relation to the print material 7 is stored in a memory of a central control unit 8 which is preferably constructed for printer operation and positioning of the second pattern. The central unit 8 is connected with a first camera arrangement 10 via a cable 9 and to a second camera arrangement 12 by a conductor 11.

The central unit 8 is of a kind known to the art and the principle construction of said unit does not therefore form any part of the present invention and the following description will only relate to those functions of the central unit necessary for evaluating the position of the pattern on the print material and for controlling the actions of known stepping motors 13, 14 and 15.

A more comprehensive understanding of the manner in which the aforesaid positions are determined, and discrepancies calculated, together with the manner in which the stepping motors are activated, can be obtained from the U.S. Pat. No. 4,610,200.

In the case of the exemplifying embodiment illustrated in FIG. 1, the position of the print material 7' in a first registered material-feed position "A" is established in relation to a reference value by means of the camera 10, 12, said reference being the printer chassis 16 for example, and the co-ordinates thus obtained are stored in the memory of the central unit 8.

The material is then moved to a second registered position "B", namely a printing position where the second pattern 7a is applied to the print material by means of the squeegee 2. The distance moved by the print material is determined precisely.

In accordance with the invention, the print material 7 with the second pattern 7a thereon is moved back to the first registered material-feed position "A" and the position of the second pattern 7a is established in said registered position and the co-ordinates read-off and stored, in a known manner, in the central unit 8.

When the co-ordinates defining a desired position of the second pattern have previously been determined, it is possible with the aid of the camera arrangements 10 and 12 and the control unit computer to establish any discrepancy between the intended position of the pattern and its actual position and to activate the stepping motors 13, 14 and 15 in a manner which will ensure that all subsequent prints will be positioned correctly on the respective print materials.

If the co-ordinates of the desired pattern position have not previously been determined, the relevant co-ordinates can be obtained by inserting the position of the first print and the displacement required for correctly positioning the print on the print material.

Thus, in response to a discrepancy established between the actual position of a pattern obtained when transferring the first pattern to the print material to obtain said second pattern and its pre-determined position, the stencil frame 5, carrying the stencil 6 which exhibits the first pattern 6a, or alternatively the print material 7 and/or the printing table 17 is displaced with the aid of the stepping motors 13,14 and 15 to an extent and in a direction such as to minimise the discrepancy established. The established discrepancy and the extent to which the different stepping motors are activated are evaluated in the central unit 8.

Each subsequent print material registered in a similar manner in the first position "A" and in the second position "B" are printed in said second position "B" with the second pattern 7a, which is applied with minimised discrepancy.

By "minimised discrepancy" is meant full compensation for an established discrepancy, or a compensation which can be considered satisfactory under the circumstances.

In accordance with the invention, when a stencil and stencil frame are changed in order to apply further pattern on the print material, any discrepancy, normally a constant discrepancy, in relation to the second pattern occurring as a result of this change is compensated for by, in the same manner as a further pattern applied to the material and the subsequent possible discrepancy in relation to the pattern is compensated for, displacing the position-detecting devices 10, 12 to an extent and in a direction such as to minimise the established discrepancy, whereafter these devices are locked in their respective set positions.

Figure 2:
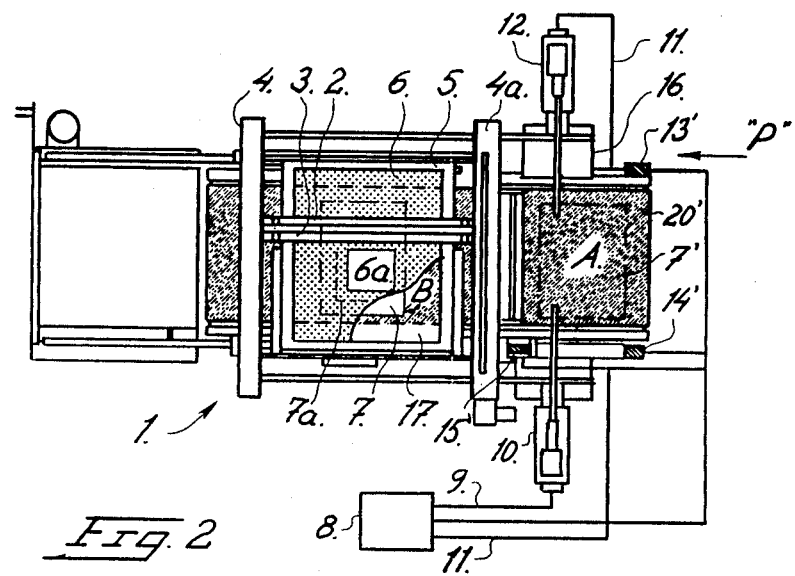
FIG. 2 is a horizontal view, highly simplified, of part of a silk screen printer having a moveable material feed table.

In the case of the embodiment illustrated in FIG. 2, the material feed position "A" has the form of a table 20' which can be moved selectively in the direction of two coordinates. The table 20' is moved by means of three stepping motors 13', 14' and 15', in a manner similar to the stepping motors illustrated in FIG. 1.

This embodiment enables the position of the table to be changed so that the print material 7' is registered in a position such that, subsequent to moving along the precisely defined transport path to the printed position, the material will be located in the desired printing position, where the second pattern is applied to the print material in a predetermined position or orientation.

It will be understood that the described and illustrated embodiments do not restrict the invention and that modifications can be made within the scope of the following claims.

I claim:

1. A method of orientating a second pattern derived from a first pattern formed on a stencil in a stencil frame, in relation to print material intended for receiving the second pattern, so that said second pattern will have a pre-determined position in relation to said material, and in which method the second pattern is formed by causing, in a printing position, coating substance to pass through the first pattern and onto the print material comprising the steps of:
   (a) establishing the position of the material in relation to a reference value in a first print material registered position, a material feed position, and storing the resultant measurement value;
   (b) moving the print material to a second print material registered position, and a printing position, and printing the second pattern on to said print material;
   (c) moving the print material provided with the second pattern back to the first print material registered position, establishing the position of the printed second pattern in relation to said reference value, and storing the resultant measurement value;
   (d) displacing one of the stencil frame, the print material, a printing table, and the first registered position of the print material in response to an established discrepancy between the actual position of the second pattern on the print material and a desired position, this displacement being effected to an extent and in a direction such as to minimize the established discrepancy;
   (e) applying a second pattern with minimized discrepancy in the second print material registered position to each subsequent print material registered in a similar manner in the first and the second print material registered positions;
   (f) changing the stencil and stencil frame in order to apply a further pattern to the print material; and compensating for a discrepancy which occurs in relation to the earlier applied second pattern by applying said further pattern to the print material in accordance with step "b", establishing any possible discrepancy in relation to the earlier applied second pattern in accordance with step "c", compensating for said discrepancy by displacing position-detecting devices in the first print material registered position to an extent and in a direction such as to minimize the established discrepancy, and locking said devices in set positions.

2. The method according to claim 1, wherein the minimized discrepancy fully compensates for the established discrepancy.

* * * * *